United States Patent
Torigata

(10) Patent No.: US 9,102,838 B2
(45) Date of Patent: Aug. 11, 2015

(54) ANTI-CORROSIVE COATING COMPOSITION PRECURSOR

(71) Applicant: TECH. TAIYO KOGYO CO., LTD., Tokyo (JP)

(72) Inventor: Hiroshi Torigata, Tokyo (JP)

(73) Assignee: TECH. TAIYO KOGYO CO., LTD., Tokyo (JP)

( * ) Notice: Subject to any disclaimer, the term of this patent is extended or adjusted under 35 U.S.C. 154(b) by 67 days.

(21) Appl. No.: 13/788,157

(22) Filed: Mar. 7, 2013

(65) Prior Publication Data

US 2014/0024759 A1    Jan. 23, 2014

(30) Foreign Application Priority Data

Jul. 17, 2012   (JP) .................................. 2012-158997

(51) Int. Cl.
| | |
|---|---|
| *C09D 5/08* | (2006.01) |
| *C09D 5/24* | (2006.01) |
| *H01B 1/12* | (2006.01) |
| *C08G 73/02* | (2006.01) |

(52) U.S. Cl.
CPC ............. *C09D 5/08* (2013.01); *C08G 73/0266* (2013.01); *C09D 5/082* (2013.01); *C09D 5/24* (2013.01); *H01B 1/128* (2013.01)

(58) Field of Classification Search
CPC .................................... C09D 5/08; C09D 5/24
USPC ................................ 524/379, 376; 427/388.1
See application file for complete search history.

(56) References Cited

U.S. PATENT DOCUMENTS

| | | | |
|---|---|---|---|
| 5,543,084 A |  | 8/1996 | Kinlen et al. |
| 2006/0204767 A1 | * | 9/2006 | Albert et al. ................ 428/447 |
| 2011/0233473 A1 | * | 9/2011 | Fletcher ..................... 252/389.1 |

FOREIGN PATENT DOCUMENTS

| | | | |
|---|---|---|---|
| EP | 0992548 | * | 4/2000 |
| JP | 06-279584 | | 10/1994 |
| JP | 2002-327151 | | 11/2002 |
| TW | 200948898 | | 12/2009 |
| TW | 201224086 | | 6/2012 |
| WO | 99/25778 A1 | | 5/1999 |
| WO | WO2004/099465 | * | 11/2004 |

OTHER PUBLICATIONS

Korean Office Action dated Mar. 20, 2014, 6 pages.
Gangopadhyay, "Exploring Properties of Polyaniline-SDS Dispersion: A Rheological Approach", Journal of Colloid and Interface Science, Academic Press, New York, NY, vol. 338, No. 2, Oct. 15, 2009, pp. 435-443, 10 pages.
Gangopadhyay, "Exploring Rheological Properties of Aqueous Polyaniline-PVP Dispersion", Journal of Polymer Science Part B: Polymer Physics, vol. 46, No. 22, Nov. 15, 2008, pp. 2443-2455, 14 pages.
G. Williams, et al., "Factors Affecting Acid-Base Stability of the Interface Between Polyaniline Emeraldine Salt and Oxide Covered Metal", Electrochemical and Solid-State Letters, vol. 8, No. 9, Jul. 29, 2005, 4 pages.
G Williams, et al., "Dopant Effects in Polyaniline Inhibition of Corrosion-Driven Organic Coating Cathodic Delamination on Iron", Journal of the Electrochemical Society, vol. 153, No. 10, Aug. 9, 2006, 10 pages.
Radhakrishnan, et al., "Conducting Polyaniline-Nano-TiO2 Composites for Smart Corrosion Resistant Coatings", Electrochimica Acta, Elsevier Science Publishers, Barking, GB, vol. 54, No. 4, Jan. 30 2009, pp. 1249-1254, 6 pages.
Extended European Search Report, Application No. 13159045.7, dated Jul. 22, 2013, 9 pages.
Taiwanese Office Action dated Sep. 24, 2014, 5 pages.

* cited by examiner

*Primary Examiner* — James J Seidleck
*Assistant Examiner* — Deve E Valdez
(74) *Attorney, Agent, or Firm* — Rankin, Hill & Clark LLP

(57) ABSTRACT

An anti-corrosive coating composition precursor enabling easily obtaining an anti-corrosive coating composition using a polyaniline powder is provided. The anti-corrosive coating composition precursor comprises polyaniline, polyvinyl butyral and an alcohol-containing solvent and has a storage modulus G' of 0.01 to 300 Pa and a loss modulus G" of 0.01 to 100 Pa obtained by a frequency dispersion measurement at a temperature of 25±1° C. at a frequency of 0.1 to 100 rad/s.

6 Claims, 1 Drawing Sheet

ANTI-CORROSIVE COATING COMPOSITION PRECURSOR

BACKGROUND OF THE INVENTION

1. Field of the Invention

The present invention relates to an anti-corrosive coating composition precursor.

2. Description of the Related Art

In recent years, the use of polyaniline as a conductive resin for an anti-corrosive coating composition is studied.

The above polyaniline can be synthesized by adding 0.2 mol of sodium dodecyl sulfate (SDS) to 100 ml of an aqueous solution containing 0.2 mol of aniline hydrochloride, heating and further adding 0.25 mol of ammonium persulfate as a polymerization initiator to carry out oxidative polymerization. Subsequently, acetone or methanol is added to the thus obtained reaction solution, thereby obtaining polyaniline precipitation (see, for example, the publication of Japanese Patent No. 3426637).

The polyaniline obtained as described above is a particle having a diameter of about 10 to 50 nm and has a property of extremely easily cohering, and which makes it difficult to store, hence problematic. Under the circumstance, the polyaniline particle is mixed with polyvinyl butyral and an alcohol-containing solvent, which is then volatilized to prevent the polyaniline particles from cohering.

With this procedure, a solid mixture having a diameter of about 8 mm with polyaniline dispersed in a matrix of polyvinyl butyral is obtained. Consequently, polyaniline can be stored in the form of the above solid mixture without coherence.

However, the solid mixture containing the polyaniline is difficult to crush due to the high hardness and cannot be dispersed in the alcohol-containing solvent when the alcohol-containing solvent is added again and knead, thereby being difficult to use in an anti-corrosive coating composition, hence inconvenient.

SUMMARY OF THE INVENTION

The present invention has an object to provide an anti-corrosive coating composition precursor which is free of the above inconvenience, storable without the polyaniline coherence and enables easily obtaining an anti-corrosive coating composition containing polyaniline.

To achieve the object, the anti-corrosive coating composition precursor of the present invention comprises polyaniline, polyvinyl butyral and an alcohol-containing solvent, and has a storage modulus G' of 0.01 to 300 Pa and a loss modulus G" of 0.01 to 100 Pa obtained by a frequency dispersion measurement at a temperature of 25±1° C. at a frequency of 0.1 to 100 rad/s.

The anti-corrosive coating composition precursor of the present invention has the storage modulus G' and the loss modulus G" respectively in the above range, owing to which an anti-corrosive coating composition with polyaniline homogeneously dispersed in polyvinyl butyral can be obtained when diluted to a predetermined concentration with, for example, an alcohol-containing solvent, or the like, as a diluent.

When the storage modulus G' exceeds 300 Pa or the loss modulus G" exceeds 100 Pa, the composition precursor cannot be diluted with a diluent such as the alcohol-containing solvent, or the like. When the storage modulus G' is below 0.01 Pa or the loss modulus G" is below 0.01 Pa, polyaniline coheres thereby failing to provide an anti-corrosive coating composition with polyaniline homogeneously dispersed in polyvinyl butyral.

The anti-corrosive coating composition precursor of the present invention preferably has the storage modulus G' within a region surrounded by the coordinates (0.1, 0.01), (100, 1), (0.1, 110) and (100, 300) when the coordinate having a value of the frequency as a and a value of the storage modulus G' as b is (a, b) in a double logarithmic graph with the frequency as the abscissa and the storage modulus G' as the ordinate, and the loss modulus G" within a region surrounded by the coordinates (0.1, 0.01), (100, 1), (0.1, 30), and (100, 100) when the coordinate having a value of the frequency as a and a value of the loss modulus G" as c is (a, c) in the double logarithmic graph.

The anti-corrosive coating composition precursor of the present invention can easily provide an anti-corrosive coating composition because the storage modulus G' and the loss modulus G" are respectively within the above range.

DETAILED DESCRIPTION OF THE PREFERRED EMBODIMENTS

Hereinafter, the embodiment of the present invention is further described in detail.

The anti-corrosive coating composition precursor of the present embodiment is a gel like product containing polyaniline, polyvinyl butyral and an alcohol-containing solvent, and has a storage modulus G' of 0.01 to 300 Pa and a loss modulus G" of 0.01 to 100 Pa obtained by a frequency dispersion measurement at a temperature of 25±1° C. at a frequency of 0.1 to 100 rad/s.

The anti-corrosive coating composition precursor of the present embodiment is further preferably has the storage modulus G' within a region surrounded by the coordinates (0.1, 0.01), (100, 1), (0.1, 110) and (100, 300) when the coordinate having a value of the frequency as a and a value of the storage modulus G' as b is (a, b) in a double logarithmic graph with the frequency as the abscissa and the storage modulus G' as the ordinate. The loss modulus G" is preferably within a region surrounded by the coordinates (0.1, 0.01), (100, 1), (0.1, 30) and (100, 100) when the coordinate having a value of the frequency as a and a value of the loss modulus G" as c is (a, c) in the double logarithmic graph.

Figure 1:
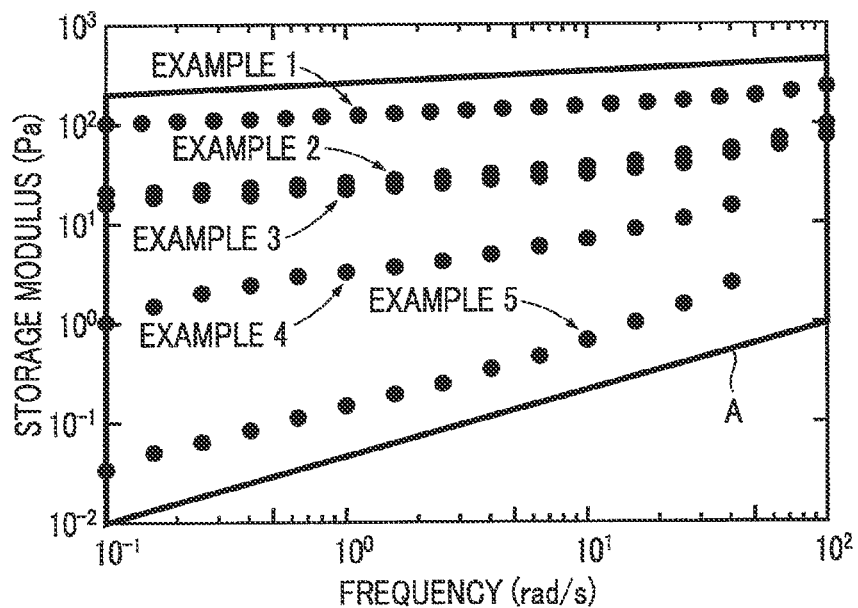
FIG. 1 is a graph showing the relation between the storage modulus G' and the frequency in the anti-corrosive coating composition precursor of the present invention.
Figure 2:
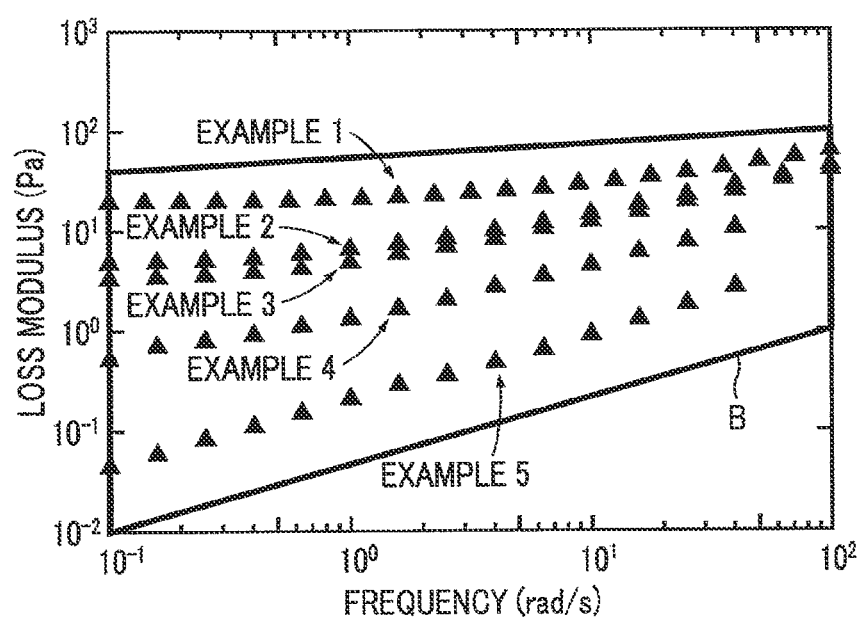
FIG. 2 is a graph showing the relation between the loss modulus G" and the frequency in the anti-corrosive coating composition precursor of the present invention.

FIG. 1 shows the region A surrounded by the coordinates (0.1, 0.01), (100, 1), (0.1, 110) and (100, 300). FIG. 2 shows the region B surrounded by the coordinates (0.1, 0.01), (100, 1), (0.1, 30) and (100, 100).

The polyaniline can be obtained, for example, as follows. 0.2 Mol of sodium dodecyl sulfate (SDS) is added to 100 ml of an aqueous solution containing 0.2 mol of aniline hydrochloride and heated. The obtained solution is then maintained at a temperature of 0° C. or lower and 0.25 mol of ammonium persulfate as a polymerization initiator is added thereto with stirring to carry out an oxidative polymerization reaction for 4 hours.

This procedure allows the initially heterogeneous reaction solution to be homogeneous as the reaction proceeds, giving the green color solution distinctive of polyaniline. Subsequently, acetone or methanol is then added to the thus obtained reaction solution, thereby obtaining polyaniline precipitation. The polyaniline obtained as described above is a particle having a diameter of about 10 to 50 nm and has a property of extremely easily cohering.

Subsequently, to prevent the polyaniline particle from cohering, the polyaniline particle is mixed with polyvinyl butyral and an alcohol-containing solvent, which is then volatilized to form a solid mixture. When mixing, the polyaniline particle, the polyvinyl butyral and the alcohol-containing solvent are mixed in a mass ratio of, for example, polyaniline particle:polyvinyl butyral:alcohol-containing solvent=10:30:60 to 32:8:60.

For the alcohol-containing solvent, mixed solvents of alcohol such as isopropanol, methoxypropanol, or the like, and other organic solvents can be used. Examples of the alcohol-containing solvent include those comprising 10 to 45 parts by mass of isopropanol, 10 to 45 parts by mass of methoxypropanol, 10 to 35 parts by mass of butanol, 5 to 25 parts by mass of xylene and 5 to 25 parts by mass of ethylbenzene, and further specific examples include those comprising 40 parts by mass of isopropanol, 40 parts by mass of methoxypropanol, 10 parts by mass of butanol, 5 parts by mass of xylene and 5 parts by mass of ethylbenzene.

The solid mixture has a diameter of about 8 mm and contains polyaniline homogeneously dispersed in a matrix of the polyvinyl butyral.

Hereinafter, a method for producing the anti-corrosive coating composition precursor of the present embodiment using the pellet particle containing polyaniline is described.

When producing the anti-corrosive coating composition precursor, the solid mixture is first immersed in the alcohol-containing solvent to swell. The solid mixture and the alcohol-containing solvent are in the mass ratio of solid mixture:alcohol-containing solvent=5:95 to 60:40, for example, in the mass ratio of solid mixture:alcohol-containing solvent=20:80.

The solid mixture swollen in the alcohol-containing solvent is fed to a high pressure disperser together with the alcohol-containing solvent. The high pressure disperser is an apparatus in which a sample is fed into a narrow channel with a solvent and a pressure of 5 to 80 MPa, for example, a pressure of 30 to 50 MPa, is applied to cause the sample to spout from the channel whereby the sample is homogeneously dispersed in the solvent.

As a result, the anti-corrosive coating composition precursor composed of a gel like product with the polyaniline particles homogeneously dispersed in the polyvinyl butyral and the alcohol-containing solvent and having the storage modulus G' within the region A and the loss modulus G" within the region B can be obtained.

In the present embodiment, to prevent the polyaniline particle having a diameter of 10 to 50 nm from cohering, the polyaniline particle is in the form of the solid mixture but may directly be the anti-corrosive coating composition precursor without formulating into the solid mixture. In this case, the polyaniline particle is mixed with the polyvinyl butyral and the alcohol-containing solvent in a mass ratio of, for example, polyaniline particle:polyvinyl butyral:alcohol-containing solvent=5:5:90. The obtained mixture is then fed into the high pressure disperser without further treatment and a pressure of 5 to 80 MPa, for example, a pressure of 20 to 50 MPa, is applied to obtain the anti-corrosive coating composition precursor.

The anti-corrosive coating composition precursor of the present embodiment can provide an anti-corrosive coating composition with polyaniline homogeneously dispersed in polyvinyl butyral when diluted to a predetermined concentration using the alcohol-containing solvent as a diluent. Alternatively, the anti-corrosive coating composition precursor may directly be used, depending on the purpose of use, as an anti-corrosive coating composition without thinning.

Examples of the present invention are described below.

Example 1

In this example, 10 parts by mass of the polyaniline particle was mixed with 30 parts by weight of polyvinyl butyral and 60 parts by weight of an alcohol-containing solvent, and the alcohol-containing solvent was volatilized to form a solid mixture containing polyaniline. The alcohol-containing solvent used comprised 40 parts by mass of isopropanol, 40 parts by mass of methoxypropanol, 10 parts by mass of butanol, 5 parts by mass of xylene and 5 parts by mass of ethylbenzene.

20 Parts by mass of the solid mixture containing polyaniline was immersed in 80 parts by mass of the alcohol-containing solvent to swell and fed into the high pressure disperser thereby, with an applied pressure of 5 MPa, obtaining an anti-corrosive coating composition precursor.

Subsequently, the storage modulus G' and the loss modulus G" of the anti-corrosive coating composition precursor obtained in this example were measured by a frequency dispersion measurement at a temperature of 25±1° C. at a frequency of 0.1 to 100 rad/s. using a rheometer (a product of Malvern Instruments Ltd., trade name: Gemini II). The measurement result of storage modulus G' is shown in FIG. 1 and the measurement result of loss modulus G" is shown in FIG. 2.

FIG. 1 confirms that the anti-corrosive coating composition precursor obtained in this example has the storage modulus G' of 0.03 to 2.50 Pa, which is within the region A. FIG. 2 confirms that the anti-corrosive coating composition precursor obtained in this example has the loss modulus G" of 0.05 to 2.56 Pa, which is within the region B.

The anti-corrosive coating composition precursor obtained in this example provided an anti-corrosive coating composition with polyaniline homogeneously dispersed in polyvinyl butyral when diluted to a predetermined concentration using the alcohol-containing solvent as a diluent comprising 40 parts by mass of isopropanol, 40 parts by mass of methoxypropanol, 10 parts by mass of butanol, 5 parts by mass of xylene and 5 parts by mass of ethylbenzene.

Example 2

An anti-corrosive coating composition precursor was obtained in exactly the same manner as Example 1, with the exception that the pressure applied in the high pressure disperser was 10 MPa.

Subsequently, the storage modulus G' and the loss modulus G" of the anti-corrosive coating composition precursor obtained in this example were measured in exactly the same manner as Example 1, with the exception that the anti-corrosive coating composition precursor obtained in this example was used. The results are shown in FIGS. 1 and 2.

FIG. 1 confirms that the anti-corrosive coating composition precursor obtained in this example has the storage modulus G' of 0.99 to 14.2 Pa, which is within the region A. FIG. 2 confirms that the anti-corrosive coating composition precursor obtained in this example has the loss modulus G" of 0.54 to 10.0 Pa, which is within the region B.

The anti-corrosive coating composition precursor obtained in this example provided an anti-corrosive coating composition with polyaniline homogeneously dispersed in polyvinyl butyral when diluted to a predetermined concentration using the alcohol-containing solvent exactly the same as used in Example 1 as a diluent.

Example 3

An anti-corrosive coating composition precursor was obtained in exactly the same manner as Example 1, with the exception that the pressure applied in the high pressure disperser was 20 MPa.

Subsequently, the storage modulus G' and the loss modulus G" of the anti-corrosive coating composition precursor obtained in this example were measured in exactly the same manner as Example 1, with the exception that the anti-corrosive coating composition precursor obtained in this example was used. The results are shown in FIGS. 1 and 2.

FIG. 1 confirms that the anti-corrosive coating composition precursor obtained in this example has the storage modulus G' of 16.0 to 73.4 Pa, which is within the region A. FIG. 2 confirms that the anti-corrosive coating composition precursor obtained in this example has the loss modulus G" of 3.48 to 39.4 Pa, which is within the region B.

The anti-corrosive coating composition precursor obtained in this example provided an anti-corrosive coating composition with polyaniline homogeneously dispersed in polyvinyl butyral when diluted to a predetermined concentration using the alcohol-containing solvent exactly the same as used in Example 1 as a diluent.

Example 4

An anti-corrosive coating composition precursor was obtained in exactly the same manner as Example 1, with the exception that the pressure applied in the high pressure disperser was 30 MPa.

Subsequently, the storage modulus G' and the loss modulus G" of the anti-corrosive coating composition precursor obtained in this example were measured in exactly the same manner as Example 1, with the exception that the anti-corrosive coating composition precursor obtained in this example was used. The results are shown in FIGS. 1 and 2.

FIG. 1 confirms that the anti-corrosive coating composition precursor obtained in this example has the storage modulus G' of 21.5 to 95.7 Pa, which is within the region A. FIG. 2 confirms that the anti-corrosive coating composition precursor obtained in this example has the loss modulus G" of 5.2 to 44.9 Pa, which is within the region B.

The anti-corrosive coating composition precursor obtained in this example provided an anti-corrosive coating composition with polyaniline homogeneously dispersed in polyvinyl butyral when diluted to a predetermined concentration using the alcohol-containing solvent exactly the same as used in Example 1 as a diluent.

Example 5

An anti-corrosive coating composition precursor was obtained in exactly the same manner as Example 1, with the exception that the pressure applied in the high pressure disperser was 50 MPa.

Subsequently, the storage modulus G' and the loss modulus G" of the anti-corrosive coating composition precursor obtained in this example were measured in exactly the same manner as Example 1, with the exception that the anti-corrosive coating composition precursor obtained in this example was used. The results are shown in FIGS. 1 and 2.

FIG. 1 confirms that the anti-corrosive coating composition precursor obtained in this example has the storage modulus G' of 106.3 to 230.1 Pa, which is within the region A. FIG. 2 confirms that the anti-corrosive coating composition precursor obtained in this example has the loss modulus G" of 20.4 to 61.1 Pa, which is within the region B.

The anti-corrosive coating composition precursor obtained in this example provided an anti-corrosive coating composition with polyaniline homogeneously dispersed in polyvinyl butyral when diluted to a predetermined concentration using the alcohol-containing solvent exactly the same as used in Example 1 as a diluent.

What is claimed is:

1. An anti-corrosive coating composition precursor comprising polyaniline, polyvinyl butyral and an alcohol-containing solvent,
    the anti-corrosive coating composition precursor having a storage modulus G' of 0.01 to 300 Pa and a loss modulus G" of 0.01 to 100 Pa obtained by a frequency dispersion measurement at a temperature of 25±1° C. at a frequency of 0.1 to 100 rad/s,
    wherein the anti-corrosive coating composition precursor is gelatinous,
    wherein the polyaniline and the polyvinyl butyral are mixed in a mass ratio within a range of polyaniline:polyvinyl butyral=10:30 to 40:10 and in the form of a mixture with the polyaniline dispersed in a matrix of the polyvinyl butyral; and
    a mass ratio of the mixture and the alcohol-containing solvent is within a range of mixture:alcohol-containing solvent=5:95 to 60:40.

2. The anti-corrosive coating composition precursor according to claim 1,
    wherein the storage modulus G' is within a region surrounded by coordinates (0.1, 0.01), (100, 1), (0.1, 110) and (100, 300) when a coordinate having a value of the frequency as a and a value of the storage modulus G' as b is (a, b) in a double logarithmic graph with the frequency as the abscissa and the storage modulus G' as the ordinate; and
    the loss modulus G" is within a region surrounded by coordinates (0.1, 0.01), (100, 1), (0.1, 30) and (100, 100) when a coordinate having a value of the frequency as a and a value of the loss modulus G" as c is (a, c) in the double logarithmic graph.

3. The anti-corrosive coating composition precursor according to claim 1,
    wherein a mass ratio of the mixture and the alcohol-containing solvent is mixture:alcohol-containing solvent=20:80.

4. The anti-corrosive coating composition precursor according to claim 1,
    wherein the alcohol-containing solvent contains isopropanol and methoxypropanol.

5. An anti-corrosive coating composition precursor comprising polyaniline, polyvinyl butyral and an alcohol-containing solvent,
    the anti-corrosive coating composition precursor having a storage modulus G' of 0.01 to 300 Pa and a loss modulus G" of 0.01 to 100 Pa obtained by a frequency dispersion measurement at a temperature of 25±1° C. at a frequency of 0.1 to 100 rad/s,
    wherein the anti-corrosive coating composition precursor is gelatinous, and,
    wherein the alcohol-containing solvent comprises 10 to 45 parts by mass of isopropanol, 10 to 45 parts by mass of methoxypropanol, 10 to 35 parts by mass of butanol, 5 to 25 parts by mass of xylene and 5 to 25 parts by mass of ethylbenzene.

6. The anti-corrosive coating composition precursor according to claim 5,
wherein the alcohol-containing solvent comprises 40 parts by mass of isopropanol, 40 parts by mass of methoxypropanol, 10 parts by mass of butanol, 5 parts by mass of xylene and 5 parts by mass of ethylbenzene.

\* \* \* \* \*